United States Patent [19]
Bahnemann et al.

[11] Patent Number: 4,900,131
[45] Date of Patent: Feb. 13, 1990

[54] ADJUSTABLE PHOTOGRAPHIC DEVICE

[75] Inventors: Volker W. Bahnemann, Greenwich, Conn.; Stanislaw Loth, Nanuet, N.Y.

[73] Assignee: Arriflex Corporation, Blauvelt, N.Y.

[21] Appl. No.: 61,870

[22] Filed: Jun. 11, 1987

[51] Int. Cl.$^4$ ..................... G02B 27/00; G03B 7/099
[52] U.S. Cl. .................................. 350/321; 350/314; 354/483
[58] Field of Search ............... 350/321, 311, 314, 316, 350/317, 312, 345; 354/482, 481, 411, 412, 413, 414, 419, 483, 421, 437; 356/8, 10; 362/26, 27, 18, 31, 300, 301

[56] References Cited

U.S. PATENT DOCUMENTS

| | | | |
|---|---|---|---|
| 2,900,949 | 8/1959 | Baker | 362/26 |
| 3,123,711 | 3/1964 | Fajans | 350/321 |
| 4,062,628 | 12/1977 | Gale | 350/314 |
| 4,200,379 | 4/1980 | Erlichman | 354/483 |
| 4,441,798 | 4/1984 | Watanabe et al. | 354/483 |
| 4,648,690 | 3/1987 | Ohe | 350/321 |
| 4,664,481 | 5/1987 | Ito et al. | 350/345 |

OTHER PUBLICATIONS

IBM Technical Disclosure Bulletin, vol. 14, No. 1, Jun. 1971, p. 223.

Primary Examiner—Bruce Y. Arnold
Assistant Examiner—Loha Ben
Attorney, Agent, or Firm—Toren, McGeady & Associates

[57] ABSTRACT

An adjustable photographic device includes a light transmission element for allowing light from an object to be photographed to pass therethrough, and light sources positioned around the periphery of the light transmission element for introducing light into the periphery of the light transmission element. This light introduced into the periphery of the light transmission element is internally reflected in the light transmission element causing the contrast of the photographed image to be controlled or modified without effecting the resolution thereof.

29 Claims, 3 Drawing Sheets

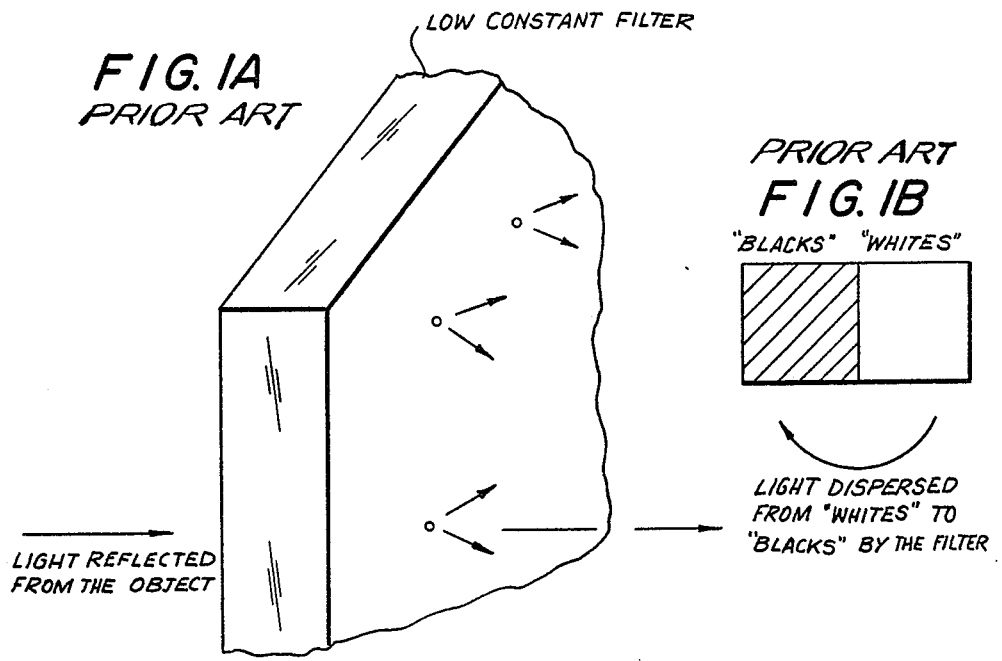
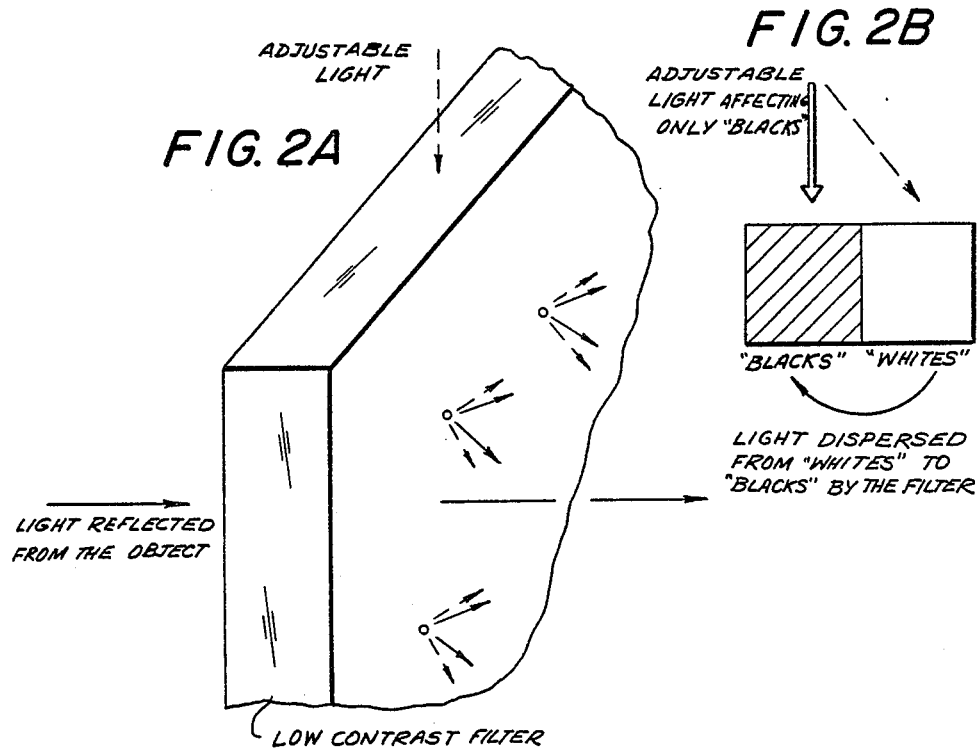

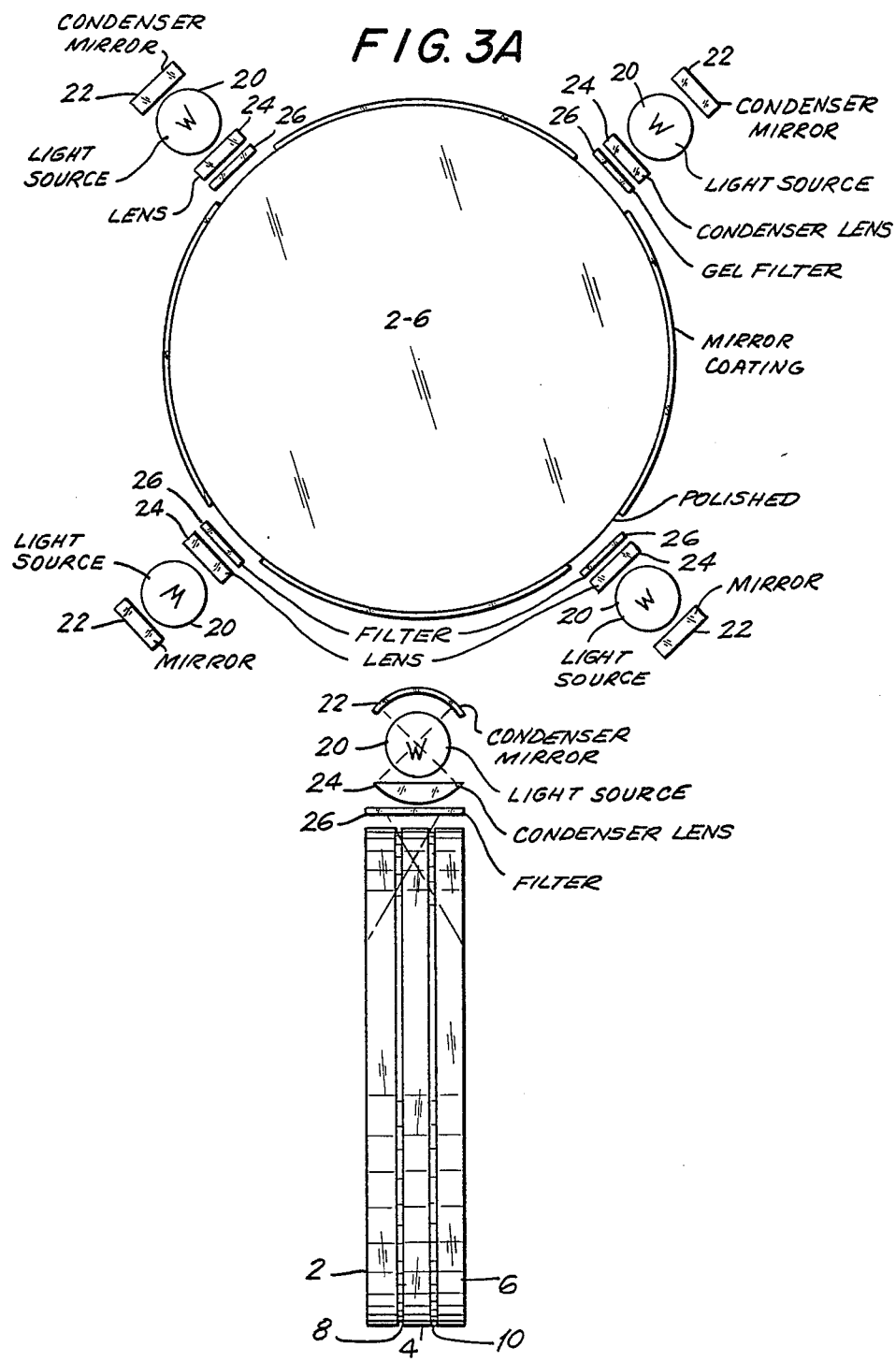

ADJUSTABLE PHOTOGRAPHIC DEVICE

BACKGROUND OF THE INVENTION

1. Field of the Invention

The present invention relates to photographic devices which allow modification and control of the contrast of a photographed image.

2. Description of Related Art

In taking photographs, a photographer encounters numerous lighting situations. While a great many of these situations may be desirable, there are undoubtably many situations in which the photographer may find it desirable, if not necessary, to modify the lighting effects. One of the methods used to modify the lighting effects is through the use of filters placed in front of the photographic objective so that any light passing through the objective to, for example, a photographic film, is influenced by the filter.

There are three main groups of filters: (a) color filters for balancing the light sensitivity of the film with tungsten light or daylight, or for adding color to the image; (b) contrast filters for changing the contrast of the scene being photographed and for adding softness thereto; and (c) effects filters for creating special effects, such as fog, star effects, rainbows, multiple images, etc.

These filters all have one thing in common, i.e., they all have unchanging optical densities, which means they cannot be adjusted to different optical densities when lighting conditions change.

In motion picture photography, there are often situations when, in one shot, the lighting conditions change dramatically. An example of these changing conditions occur when a photographer "pans" the camera from one area to another. If the first area is bathed in sunlight while the second area is in deep shadows, the photographer is faced with a high contrast situation followed immediately by a low contrast situation. If the photographer selects a particular low contrast filter to overcome the contrast in the sunlit area, he will then lose needed contrast in the shadow area.

SUMMARY OF THE INVENTION

An object of the invention is to provide a photographic device which allows a photographer to adapt quickly to changing lighting conditions.

Another object of the invention is to provide a photographic device which allows a photographer to selectively change the contrast of the photographed image without affecting the resolution thereof.

These and other objects are achieved in an adjustable photographic device comprising a filter element and means for adjustably introducing light into a side portion of the filter element so that said light is internally reflected in said filter element whereby, the amount of said light introduced into said filter element determines the optical contrast of the photographed image.

As shown in FIGS. 1A and 1B, low contrast or fog filters disperse light reflected from a photographed object when this light passes through a special "soft" filter surface. In this way, a certain amount of light forming the lighter parts of the image is scattered, that is reflected to the "blacks" in the low end of the exposure. Since the image-forming light is scattered indiscriminately, this results in a certain loss of image definition. A low contrast or softening filter effect is, therefore, proportional to a loss in image definition. This function limits the use of low contrast or fog filters to certain optical densities. After passing a certain point of light dispersion, the loss of image definition is unacceptable.

In the adjustable photographic device of the subject invention, the "soft" image effect is separated from the low contrast effect. To this end, as shown in FIGS. 2A and 2B, a basic low contrast filter is chosen for the degree of image softening that is desired. Additional low contrast effect is provided by internal filter illumination which brings additional light dispersion to the shadows, without reducing the image definition. The blacks are affected separately by the soft structure of the filter and by the additional light illuminating the internal structure of the filter. This allows control over the photographic effect in a way that has not been possible before.

While a basic low contrast filter is described above as being the filter element, it is also desirable to use ordinary optical glass for the filter element. In this case, the range of internal light dispersing starts from zero, i.e. no dispersing of the light from the scene to be photographed.

BRIEF DESCRIPTION OF THE DRAWINGS

With the above and additional objects and advantages in mind as will hereinafter appear, the invention will be described with reference to the accompanying drawings, in which:

FIGS. 1A and 1B show, in functional block diagram form, the effect a prior art device has on light from a scene to be photographed;

FIGS. 2A and 2B show, in functional block diagram form, the effect the adjustable filter of the subject invention has on light from the scene to be photographed;

FIGS. 3A and 3B show, in functional block diagram form, a preferred embodiment of the invention.

DESCRIPTION OF THE PREFERRED EMBODIMENT

Figures 4A, 4B:
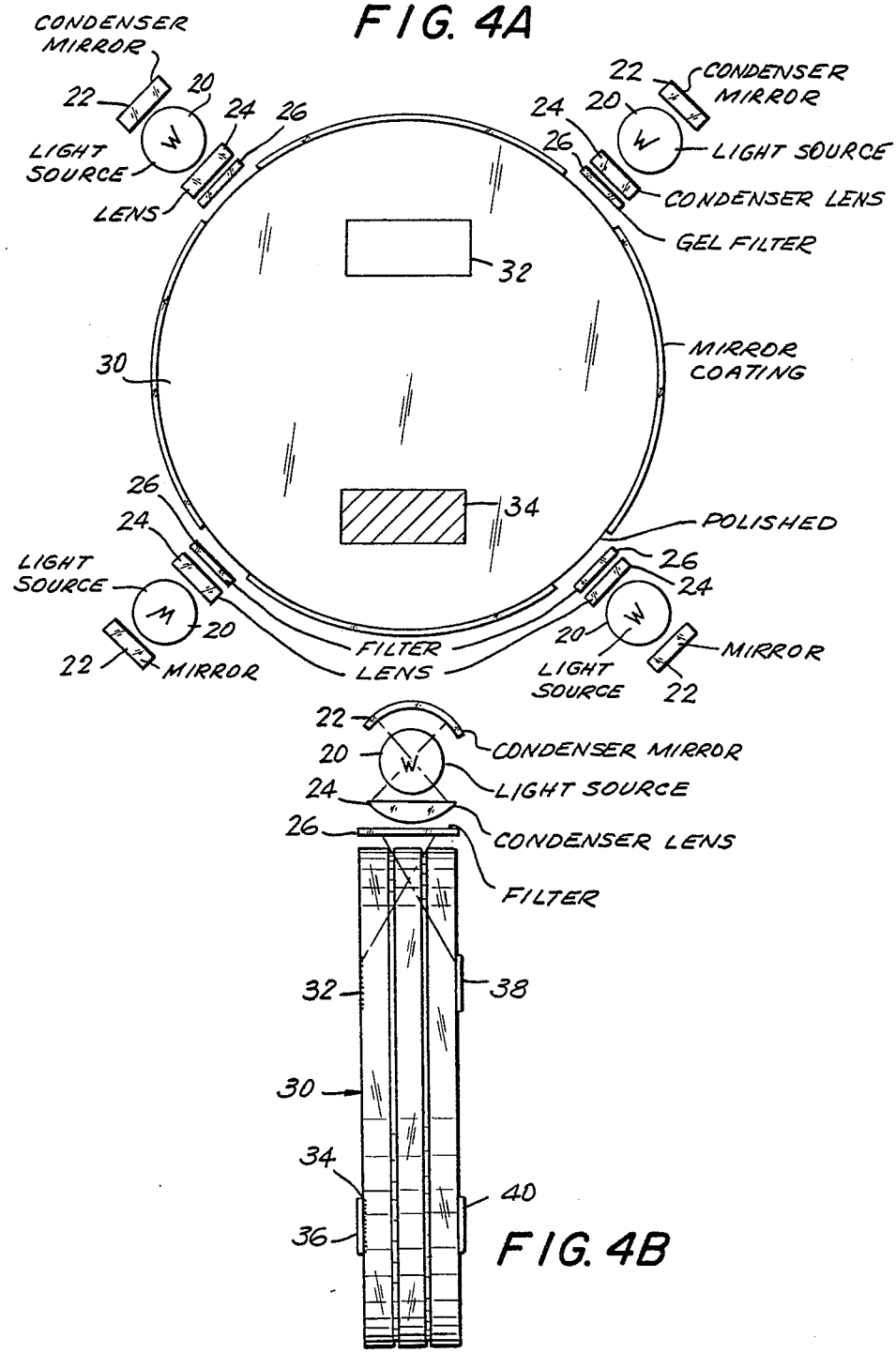
FIGS. 4A and 4B show a contrast indicator using the principles of the subject invention.

In accordance with the subject invention, the adjustable photographic device includes at least one optical glass plate. As shown in FIGS. 3A and 3B, three round planar glass plates 2, 4 and 6 are superposed one over the other. Spacers 8 and 10 are positioned between the plates 2 and 4 and the plates 4 and 6, respectively, around the periphery of the plates to fix the plates 2–6 with respect to each other, to avoid Newton ring effects and to prevent the entry of dust and other contaminants between the plates 2–6. By combining multiple glass plates, the internal light dispersing effect is multiplied.

A plurality of light sources 20 are arranged around the periphery of the glass plates 2–6 to introduce light therein. Cylindrical condenser mirrors 22 are respectively positioned behind the light sources 20 to concentrate the light energy from the light sources 20 toward the glass plates 2–6. Cylindrical condenser lenses 24 can be positioned between the light sources 20 and the glass plates 2–6 to condense all light onto the edges of the glass plates 2–6 at the angle of most efficient internal reflection ($<70°$) from the surfaces of the glass plates 2 to 6. Optionally, gel filters 26 may be positioned between the condenser lenses 24 and the glass plates 2–6 for providing desired lighting effects.

The edges of the glass plates 2–6 are polished for maximum light entry efficiency. However, except for the areas directly beneath the light sources, the edges of the glass plates 2–6 are mirror coated for to prevent the light from the light sources from escaping thereby ensuring maximum internal reflection from the planar surfaces. In addition, the planar surfaces of the glass plates 2–6 have an anti-reflection coating for maximum transparency for light rays from the object to be photographed.

A variable power source (not shown) is provided for variably energizing the light sources 20 to selectively vary the light output thereof without effecting the color temperature. It is also possible to vary the light output by allowing the light sources to be movable or by providing a movable shutter to block out the light.

In operation, the adjustable photographic device of the present invention is placed in front of the objective lens of the camera. In order to lower the contrast of the scene to be photographed, the photographer energizes the light sources 20 thereby causing light therefrom to enter the glass plates 2–6 reflecting on the inner planar surfaces thereof. This illumination of the plates 2–6 lowers the contrast of the scene to be photographed by adding light to the dark parts of the scene without affecting the brigher areas. By adjusting the position of the light sources, the photographer is able to easily adjust this contrast compression effect of the device.

If it is desired to modify the color of the scene, the gel filters 26 may be inserted between the condenser lenses 24 and the glass plates 2–6.

As indicated above, the glass plates 2–6 may be replaced by actual filters giving the photographer greater latitude in the obtainable effects. Alternatively, actual filters may be placed in front of the glass plates 2 to 6, to achieve the desired effects.

In photography, it is always necessary to reduce the range of contrast of a scene to be photographed. In particular, while the contrast range of the human eye is approximately 1:1000, the contrast range for a motion picture is 1:100. In addition, depending on the photographing medium, it may be necessary to reduce the contrast range even further, i.e. the maximum attainable contrast range for video is approximately 1:60 and the maximum attainable contrast range for a photograph is approximately 1:20. Hence, in order to achieve the optimum photographic situation, it is desirable for the photographer to know the contrast range of the scene to be photographed as well as the desired contrast range.

The above features of the adjustable photographic device may be realized in a contrast indicator. As shown in FIGS. 4A and 4B, the glass plates 2–6 may be replaced by a contrast indicator plate 30. The contrast indicator plate 30 is made of optical glass and includes two areas 32 and 34 at which the contrast indicaton plate 30 is ground. The area 34 is covered with a neutral optical density filter 36 having a desired darkness. The area 32 is masked on the opposite side of the contrast indicator plate 30 with a nontransparent white screen 38, while the area 34, on the opposite side of the contrast indicator plate 30, is masked with a nontransparent black screen 40. Arranged as such, the area 32 represents the white end of the desired contrast range while the area 34 represents the black end. In order to accommodate various desired contrast ranges, a plurality of contrast indicator plates 30 are provided in which the darkness of the neutral optical density filter 36 is varied giving the desired contrast range.

In operation, when the adjustable photographic device is mounted on a camera, the glass plates therein are replaced by the contrast indicator plate 30 having the desired contrast range. When the light source 20 is turned on, the ground surface in the area 32 is illuminated and appears white through the view finder of the camera. Since the contrast indicator plate 30 is made of optical glass, the scene to be photographed also appears in the view finder. Then with an appropriately illuminated black field in the scene, the photographer is able to adjust the illumination of the light source 20 to achieve the desired contrast range. In particular, the photographer adjusts the illumination of the light source 20 until the black field corresponds to the "black" area 34, the "white" area 32 automatically becoming properly adjusted. Having thus achieved the proper setting for the light source 20, the photographer then removes the contrast indicator plate 30 and reinstalls the glass plates 2–6 and is then able to proceed to photograph the scene knowing that the resulting contrast range is proper.

While contrast indicator plate 30 is described above as replacing the glass plates 2–6 in the adjustable photographic device on the camera, it is also possible to arrange the contrast indicator in a separate unit with its own independent light source. The adjustment for the light source should then be calibrated so that a resulting reading may be transferred to the adjustable photographic device. After the setting of the proper illumination for the light source, this contrast indicator may then be used to determine if any portions of the scene will be either overexposed or underexposed due to changing lighting conditions. The photographer first adjusts the scene lighting such that a black field in the scene matches the "black" area 34. Then, if any white field in the scene is brighter than the "white" area 32, that portion of the scene will be overexposed. Conversely, the photographer adjusts the scene lighting to match a white field in the scene with the "white" area 32, and if any black field in the scene is darker than the "black" area 34, this portion of the scene will be underexposed.

Numerous alterations of the structure herein disclosed will suggest themselves to those skilled in the art. However, it is to be understood that the present embodiment is for purposes of illustration only and not to be construed as a limitation of the invention. All such modifications which do not depart from the spirit of the invention are intended to be included within the scope of the appended claims.

What is claimed is:

1. An adjustable photographic device, comprising:
    light transmission means for allowing light from an object to be photographed to pass through a front surface and a rear surface thereof, said light transmission means having a peripheral portion; and
    means for introducing a variable amount of light into said peripheral portion of said light transmission means so that rays of said variable amount of light meet said front and rear surfaces at angles greater than the critical angle of said light transmission means and are thereby internally reflected by said front and rear surfaces within said light transmission means so as to adjust contrast of the object to be photographed without effecting resolution thereof.

2. An adjustable photographic device as claimed in claim 1, wherein said light transmission means is planar.

3. An adjustable photographic device as claimed in claim 1, wherein said light transmission means comprises at least one optical glass plate.

4. An adjustable photographic device as claimed in claim 3, wherein said light transmission means comprises three optical glass plates and said device further comprises spacer means positioned between said plates at the peripheries thereof for fixing the plates with respect to each other, for avoiding Newton ring effects and to prevent entry of dust and other contaminates between the plates.

5. An adjustable photographic device as claimed in claim 4, wherein said glass plates are polished around the peripheries thereof and are mirror coated around the peripheries thereof except for the peripheral portions underlying said light introducing means thereby preventing the light from said light introducing means from escaping through the peripheries of said glass plates.

6. An adjustable photographic device as claimed in claim 4, wherein said glass plates are coated with an anti-reflective coating on planar surfaces thereof to enhance maximum transparency for light from an object to be photographed.

7. An adjustable photographic device as claimed in claim 1, wherein said light transmission means comprises a low contrast filter element.

8. An adjustable photographic device as claimed in claim 1, wherein said light introducing means comprises a plurality of light sources positioned near the peripheral portion of said light transmission means.

9. An adjustable photographic device as claimed in claim 8, wherein said device further comprises cylindrical condenser mirrors, each positioned outside of each of said light sources for concentrating light energy from the light sources toward the peripheral portion of the light transmission means.

10. An adjustable photographic device as claimed in claim 9, wherein said device further comprises cylindrical condenser lenses, each positioned between each of the light source and the peripheral portion of said light transmission means for condensing the light from the light sources into the peripheral portion at an angle for most efficient internal reflection in said light transmission means.

11. An adjustable photographic device as claimed in claim 10, wherein said device further comprises gel filters, each selectively positioned between each of said cylindrical condenser lenses and the peripheral portion of said light transmission means for providing a desired lighting effect.

12. An adjustable photographic device as claimed in claim 8, wherein said light sources are evenly distributed about the periphery of said light transmission means.

13. An adjustable photographic device as claimed in claim 8, wherein said light sources are energized uniformly.

14. An adjustable photographic device as claimed in claim 8, wherein said light sources are differentially energized for illuminating a selected portion of said light transmission means more than a remaining portion of said light transmission means.

15. An adjustable photograhic device as claimed in claim 8, wherein said plurality of light sources are movable so as to allow the amount of light introduced into said light transmission means to be varied.

16. An adjustable photographic device as claimed in claim 8, wherein said light introducing means further includes shutter means for selectively blocking a portion of the light of said plurality of light sources from said light transmission means so that the light is dimmed without changing the color temperature thereof.

17. A contrast indicator comprising:
a plurality of optical glass means, each having a peripheral portion and a front and a rear surface, wherein a first and a second separated area on said front surface are ground;
a plurality of neutral optical density filters, having different darknesses, mounted, respectively, on the front surfaces of said optical glass means over said respective second separated areas;
nontransparent white screening means arranged on the back surfaces of each of said plurality of optical glass means in an area corresponding to said first separated area;
nontransparent black screening means arranged on the back surfaces of each of said plurality of optical glass means in an area corresponding to said second separated area; and
means for introducing a variable amount of light into said peripheral portion of a selected one of said optical glass means so that said light is internally reflected in said selected optical glass means thereby illuminating said ground first and second separated areas and also adjusting a contrast range of a scene to be photographed, whereby a desired contrast range is achieved by observing a black portion of the scene and adjusting the amount of light introduced into said selected optical glass means using said light introducing means until the black portion of the scene corresponds to the second separated area on said optical glass means.

18. A contrast indicator as claimed in claim 17, wherein each of said optical glass means comprises at least one optical glass plate.

19. A contrast indicator as claimed in claim 17, wherein each of said optical glass means comprises three superposed optical glass plates and said indicator further comprises spacer means positioned between said plates at the periphery thereof for fixing the plates with respect to each other, for avoiding Newton ring effects and for preventing entry of dust and other contaminates between the plates.

20. A contrast indicator as claimed in claim 19, wherein said glass plates are polished around the periphery thereof and are mirror coated around the periphery except for the peripheral portions underlying said light introducing means.

21. A contrast indicator as claimed in claim 19, wherein said glass plates are coated with an anti-reflective coating on planar surfaces thereof to enhance maximum transparency.

22. A contrast indicator as claimed in claim 17, wherein said light introducing means comprises a plurality of light sources positioned near the peripheral portion of said optical glass means.

23. A contrast indicator as claimed in claim 22, wherein said contrast indicator further comprises cylindrical condenser mirrors, each positioned outside of each of said light sources for concentrating light energy from the light sources toward the peripheral portion of the optical glass means.

24. A contrast indicator as claimed in claim 23, wherein said contrast indicator further comprises cylindrical condenser lenses, each positioned between each of the light sources and the peripheral portion of said optical glass means for condensing the light from the light sources into the peripheral portion at an angle for most efficient internal reflection in said optical glass means.

25. A contrast indicator as claimed in claim 22, wherein said light sources are evenly distributed about the periphery of said optical glass means.

26. A contrast indicator as claimed in claim 22, wherein said light sources are energized uniformly.

27. A contrast indicator as claimed in claim 22, wherein said light sources are differentially energized for illuminating a selected portion of said optical glass means more than a remaining portion of said optical glass means.

28. A contrast indicator as defined in claim 22, wherein said plurality of light sources are movable so as to adjust the amount of light introduced into said selected optical glass means.

29. A contrast indicator as defined in claim 22, wherein said light introducing means further includes shutter means for selectively blocking a portion of the light of said plurality of light sources from said optical glass means so that the light is dimmed without changing the color temperature thereof.

* * * * *